(No Model.)
J. R. WINDMILL.
MOLD FOR GLASS BOTTLES, JARS, OR OTHER LIKE ARTICLES.
No. 416,389. Patented Dec. 3, 1889.
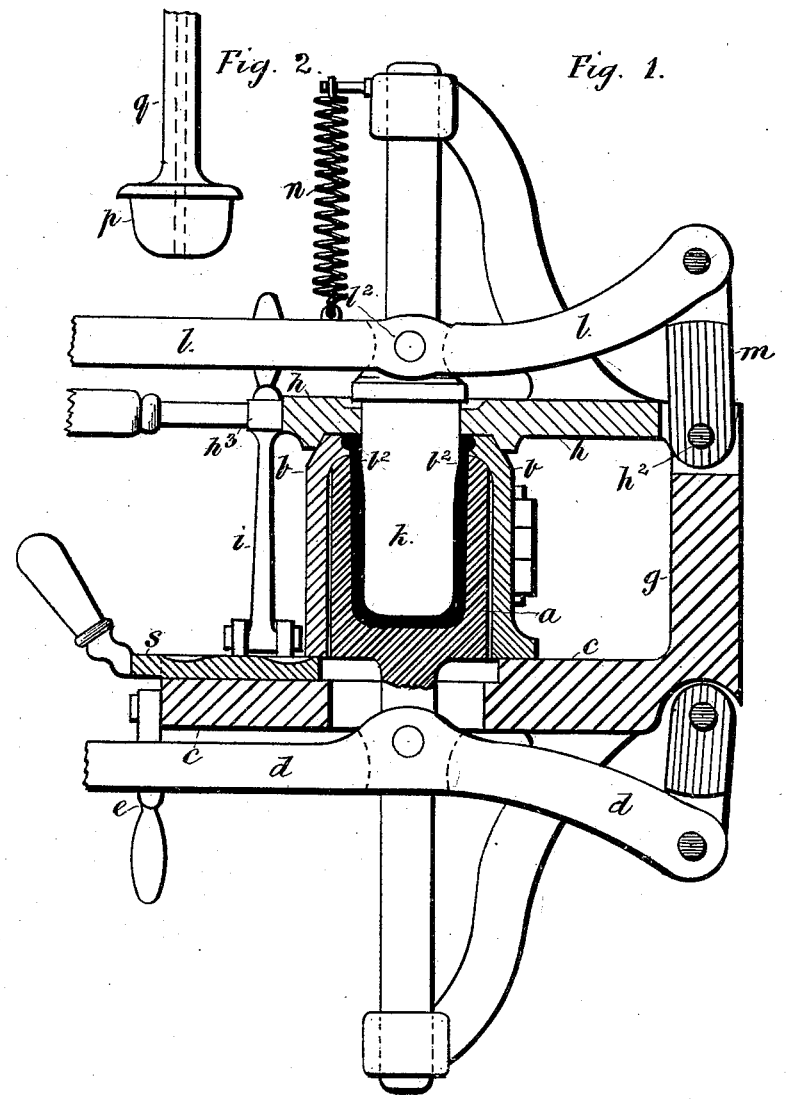
Witnesses.
H. F. Cleeve
A. W. Rouse.
Inventor.
James Richard Windmill
by his attorney
Philip Hathaway

UNITED STATES PATENT OFFICE.

JAMES RICHARD WINDMILL, OF BRIERLEY HILL, COUNTY OF STAFFORD, ASSIGNOR TO DAN RYLANDS, OF BARNSLEY, ENGLAND.

MOLD FOR GLASS BOTTLES, JARS, AND OTHER LIKE ARTICLES.

SPECIFICATION forming part of Letters Patent No. 416,389, dated December 3, 1889.

Application filed January 14, 1889. Serial No. 296,369. (No model.) Patented in England June 29, 1886, No. 8,526.

*To all whom it may concern:*

Be it known that I, JAMES RICHARD WINDMILL, a subject of the Queen of Great Britain, residing at Brierley Hill, in the county of Stafford, England, have invented new and useful Improvements in Molds for Glass Bottles, Jars, and other Like Articles, (for which I have obtained a patent in Great Britain, No. 8,526, bearing date June 29, 1886,) of which the following is a specification.

My invention consists in manufacturing glass bottles and glass jars and other like glass articles by the combination of the processes of pressing and blowing, as hereinafter described.

My invention consists, further, of the apparatus hereinafter described, to be used in conducting the said pressing and blowing processes.

I will describe my invention as applied to the manufacture of glass jars and glass bottles in conjunction with the apparatus which I prefer to use.

The apparatus consists, essentially, of a sliding mold in which the pressing of the glass article is effected and a second or outer mold surrounding the sliding mold, in which second mold the pressed article is blown and the required form given to it. The sliding pressing-mold consists of a cylinder having a cavity or mold of the required shape made in it, the said sliding mold working through an opening in the base-plate of the apparatus. The rising and falling motion of the sliding mold is effected by a lever, the said mold, when raised within the blowing-mold, being held in that position by a catch engaging with the lever of the sliding mold. On the base of the apparatus the blowing-mold is supported, the said mold being divided vertically into two halves, hinged together at back, the said halves when closed being held together by a catch. Jointed to an upright at one side of the base-plate of the apparatus is a cover by which the compound mold is closed, the said cover being held down by a catch. Through this cover a pressing-plunger for operating upon the melted glass in the pressing-mold works, the said plunger being jointed to a lever, and the latter to a link connected to the upright to which the cover is jointed. A coiled spring between the plunger-lever and the cover described raises the said plunger from the mold. The top of the blowing-mold is provided with a neck or contraction in which the neck of the glass article being made is formed.

When the article is being blown in the outer mold, the said mold is closed air-tight by a conical cap or cover on the end of the blowing-pipe, the said cap or cover fitting in the open end of the mold and top of the article and accurately closing them.

Instead of combining the pressing-mold and the blowing-mold in the same apparatus, the two molds may be used apart, substantially in the manner described, for the pressing and blowing operations.

The glass jar or glass article to be made is first pressed into a roughly-formed article in the pressing-mold, and its shape is perfected and finished by blowing it in the second or blowing mold.

I will now proceed to describe with reference to the accompanying drawings the manner in which my invention is to be performed.

Figure 1 represents in side elevation apparatus constructed according to my invention for the manufacture of a glass jar or bottle according to my method, the said apparatus having combined in it the sliding pressing-mold and the jointed or hinged blowing-mold; and Fig. 2 represents that part of the apparatus which is combined with the apparatus, Fig. 1, during the blowing or finishing stage of the glass jar or bottle, as hereinafter described.

$a$ is the pressing-mold, capable of a sliding motion, and $b$ is the second or outer mold, made in two parts hinged together at back. The blowing-mold $b$ is supported on the base-plate $c$, the sliding pressing-mold $a$ working through an opening in the said base-plate $c$.

In Fig. 1 the sliding pressing-mold $a$ is represented in its raised position, and the blowing-mold $b$ is represented closed. The said blowing-mold $b$ is furnished at top with the neck or contraction $b^2$, in which the neck of the glass jar or bottle is formed, and the said blowing-mold is opened and closed by means of handles, (not represented,) and when closed the two parts are fastened together by a catch. The rising and falling motion of the sliding pressing-mold $a$ is effected by the lever $d$, the said mold $a$ being supported in its raised position within the blowing-mold $b$ by the catch $e$ engaging with the lever $d$ of the sliding mold, as represented in Fig. 1.

$h$ is the cover by which the combined mold $a\ b$ is closed, the said cover being jointed at $h^2$ to the upright $g$. The cover $h$ when lowered is held down by the catch $i$, engaging in the depression $h^3$ in the handle part of the cover.

$k$ is the pressing-plunger for operating upon the melted glass in the pressing-mold $a$, the said plunger working through the hinged cover $h$. The plunger $k$ is jointed at $l^2$ to the lever $l$, and the latter to a link $m$, jointed to the upright $g$. By means of the coiled spring $n$, between the lever $h$ and plunger-lever $l$, the said plunger $k$ is raised from the mold $a$.

$s$ is a slide or sliding plate for closing the opening in the base-plate $c$ after the pressing-mold $a$ has been depressed and the blowing-mold $b$ is about to be used; or, the closing of the opening in the base-plate $c$ may be effected by turning the blowing-mold $b$ to a part of the base-plate having no hole in it, the said part of the base-plate in that case constituting the bottom of the blowing-mold $b$.

$p$, Fig. 2, is the conical cap or cover on the blowing-pipe $q$, which cap and blowing-pipe are used when the article is being blown in the mold $b$. The cap or cover $p$ fits in the open end of the mold $b$ and top of the artic'e and accurately closes them.

In making a glass jar according to my invention I proceed as follows: The sliding pressing-mold $a$ is raised into the outer blowing-mold $b$ by the hand-lever $d$, and the said mold $a$ is supported in its raised position by the catch $e$ engaging with the hand-lever $d$, as represented. The halves of the blowing-mold $b$ are next closed by their handles and fastened together by the catch. The melted glass being placed in the pressing-mold $a$ the cover and plunger $h\ k$ are brought down and the said cover fastened in its place by the catch $i$. By operating the plunger $k$ by its lever $l$ the melted glass is pressed and fashioned in the mold $a$, a portion of the glass being forced into the neck $b^2$ of the outer or blowing mold $b$. The cover and plunger being raised and thrown back, the sliding mold $a$ is depressed through the base-plate $c$, leaving the pressed glass article attached by its neck to the neck $b^2$ of the blowing-mold $b$. The opening in the base-plate $c$, through which the sliding mold is withdrawn, having been closed by the slide or sliding plate $s$ or the mold $b$ turned onto an imperforated part of the base-plate $c$, the cap or cover $h$, Fig. 2, of the blowing-pipe $q$ is fitted into the top of the blowing-mold $b$ and article, and the pressed article is now blown in the said mold in the ordinary way of blowing glass articles. The cover $h$ being removed and the blowing-mold opened upon its hinge, the glass jar or bottle is removed and the operations described are repeated. In this manner the melted glass is first pressed into a roughly-formed jar or bottle and the pressed jar or bottle afterward completed by blowing it in a second mold.

Although in the accompanying drawings I have represented the apparatus which I prefer to use in carrying my invention into effect, and which I have found to answer well in practice, yet I do not limit myself thereto, as other kinds of apparatus may be employed in conducting my method of manufacture.

What I claim as new, and desire to secure by Letters Patent, is—

1. The combined mold $a\ b$, having a sliding pressing-mold $a$, with a rising and falling action, as described, working within an outer blowing-mold $b$, such mold $b$ being supported on the base-plate $c$, and being furnished at the top with the neck or contraction $b^2$, and the movable cap $p$, the said combined mold $a\ b$ being capable of being closed during the pressing operation by the common cover $h$, substantially as and for the purposes described.

2. The cover $h$ of the combined mold $a\ b$, operating as described.

3. The sliding pressing-mold $a$, having a rising and falling action, as described, in combination with the outer blowing-mold $b$, substantially as and for the purposes described.

4. The combination of the sliding pressing-mold $a$, blowing-mold $b$, plunger $k$, cover $p$, and blowing-pipe $q$.

5. The combined mold $a\ b$, in combination with the base-plate $c$, cover $p$, and blowing-pipe $q$, substantially as described.

6. The combined mold $a\ b$, in combination with the plunger $k$, plunger-lever $l$, and spring $n$, substantially as described.

7. The combined mold $a\ b$, in combination with the base-plate $c$, plunger $k$, plunger-lever $l$, cover $p$, and blowing-pipe $q$, substantially as described.

In testimony whereof I have hereunto set my hand and seal in the presence of two subscribing witnesses.

JAMES RICHARD WINDMILL. [L. S.]

Witnesses:
 WILLIAM WALDRON,
 A. E. GUY PRITCHARD,
  *Solicitors, both of Brierley Hill.*